Figure 1:
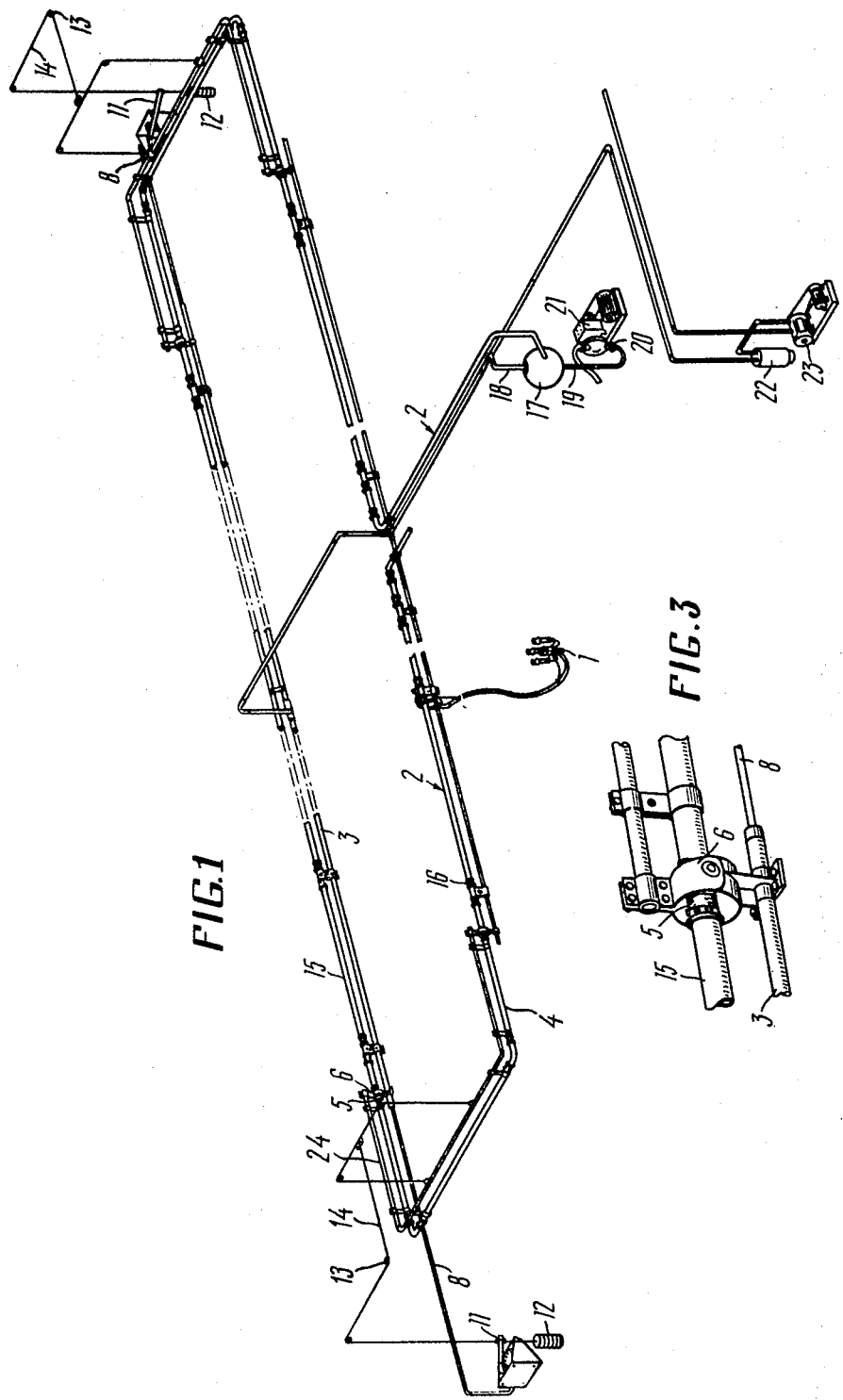

United States Patent

[11] 3,583,366

[72] Inventors Zinovy Yakovlevich Zhuk
 11 Parkovaya ulitsa, korpus 1, kv. 50;
 Vladimir Semenovich Zelikov, Armyansky pereulok, 9, kv. 71, both of Moscow;
 Vladimir Pavlovich Prikodko, Bibliotechanya ulitsa, 6, kv. 88, Levoberezhie Moskovskoi; Vladimir Ivanovich Ivano, Uchinskaya ulitsa, 9, korpusl, kv. 5; Nikolai Sergeevich Prusov, poselok SVS, 9, kv. 12, both of Moscow, all of, U.S.S.R.
[21] Appl. No. 791,965
[22] Filed Jan. 17, 1969
[45] Patented June 8, 1971

[54] MILKING PLANT WITH VACUUM AND MILK LINES
 6 Claims, 3 Drawing Figs.
[52] U.S. Cl. ................................................ 119/14.03
[51] Int. Cl. ................................................ A01j 5/00
[50] Field of Search .......................................... 119/14.03

[56] References Cited
UNITED STATES PATENTS
| | | | |
|---|---|---|---|
| 1,718,822 | 6/1929 | Hulbert ....................... | 119/14.03X |
| 2,671,428 | 3/1954 | Hill ............................. | 119/14.03 |
| 3,015,306 | 1/1962 | Merritt et al. ............... | 119/14.03 |

Primary Examiner—Hugh R. Chamblee
Attorney—Waters, Roditi, Schwartz & Nissen

ABSTRACT: A milking plant is provided in which a milking operation is effected by means of a milking apparatus connected to a milk line which is subject to vacuum produced in a vacuum line. The milk line is used for transporting the milk and a portion of the milk line disposed above an animal feed passage is constructed for pivotal movement and is automatically raised when the milking operation is halted to enable passage of a feed distributor, and lowered in the course of the milking operation.

MILKING PLANT WITH VACUUM AND MILK LINES

The present invention relates to milking plants with vacuum and milk lines.

Known in the prior art are milking plants with vacuum and milk lines, wherein milk lines are disposed at a height of up to 2 m. with regard to the level of the milking stall floor.

In said plants, however, the transverse links of the milk line disposed above the feeding passage prevent the use of mobile means of fodder distribution, and, therefore, make it necessary either to raise the milk line to a height of up to 3 m., or to lay it in a trench under the feeding passage, both said cases resulting in lower quality of milk, for instance in its impurity, as well as in the disturbance of the milkers' vacuum.

Also known in the prior art is a milking plant wherein the transverse links of the milk line are made removable. This plant, however, is not reliable in operation and is not economical as it requires an additional amount of time for assembly and disassembly of the milk line in the course of which the links of the line often become broken.

Likewise known is the "Daugava" milking plant having a milk line in which the transverse links are mounted on joints and are essentially fashioned as turnable portions.

In these plants the turnable portions of the milk line are manually set into vertical position to let the fodder distributors pass along the feeding passage, and are brought back into horizontal position prior to milking.

The bringing of the turnable portions of the milk line of the latter milking plant into the vertical position and back into the horizontal position requires an additional amount of time.

The design of the plant does not exclude the possibility of carrying out milking with the turnable portions of the milk line raised, which results in a lower quality of milk.

The invention is aimed at the provision of such a milking plant with a milk line that can be used in a live stock barn together with mobile fodder distributors and without any additional consumption of labor, disturbance of vacuum of the milkers and lowering of the milk quality.

The above and other objects of the invention are accomplished in that, in order to raise each of the milk line turnable portions, the proposed milking plant is provided with a drive fashioned as a chamber communicating with the vacuum line, and a partition moved inside said space and connected with a turnable portion of the milk line.

It is expedient to fashion the partition as a membrane connected to a rod, said rod being connected to an end of a double-arm lever having its other end connected directly to a counterweight and, through a system of pulleys, to a turnable portion of the milk line.

Such a design of the milking plant with a milk line makes it possible to provide an all-round mechanization of the milking and fodder distribution processes in a live stock barn.

Other objects and advantages of the present invention will become apparent from a consideration of a exemplary embodiment thereof.

Figure 2:
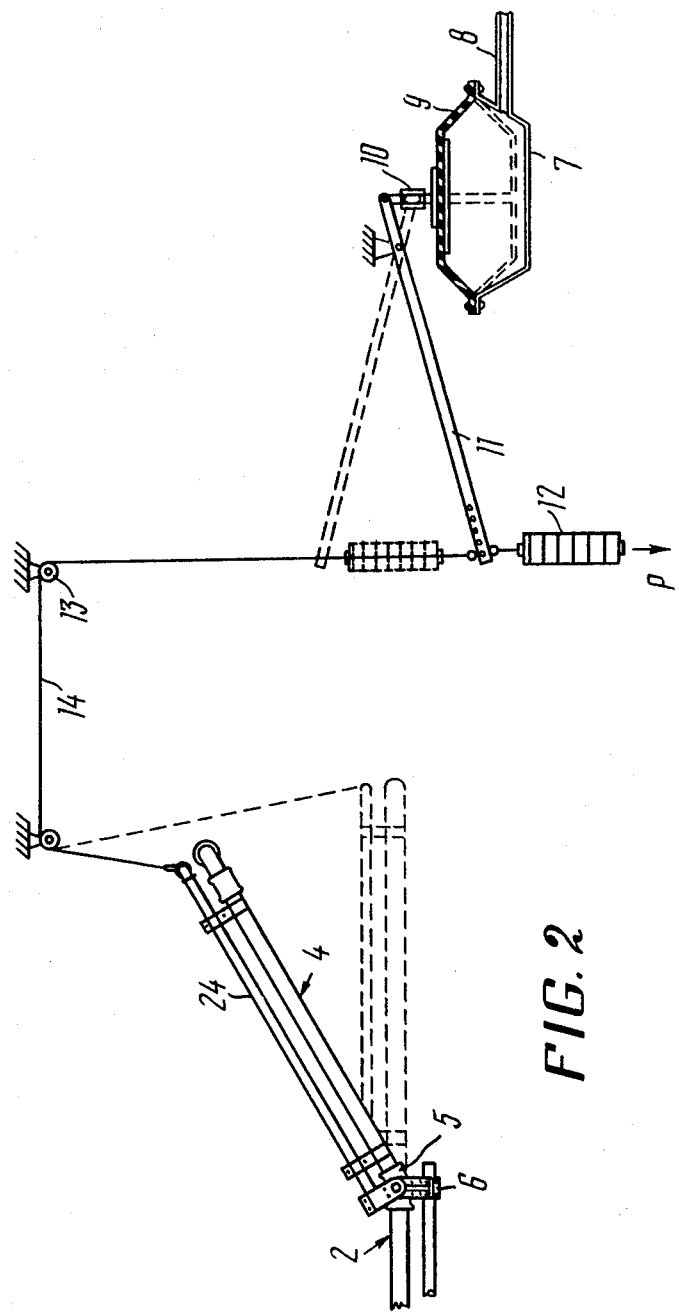

The following detailed description of such exemplary embodiment of the present invention is given with reference to the accompanying drawing, in which:

FIG. 1 diagrammatically shows a milking plant with vacuum and milk lines, according to the invention;

FIG. 2 shows a diagrammatic elevation view of a drive for raising turnable portions of the milk line; and FIG. 3 shows a detail of the fastening of the turnable portions of the milk line.

A milking plant comprises milkers 1 (FIGS. 1 and 3) communicating with milk line 2 and vacuum line 3. The milk line 2 has turnable portions 4, connected thereto by means of elastic pipes 5 mounted in clamps 6. To raise the turnable portions 4 of the milk line 2 provision is made for drive means (FIG. 2) in a number corresponding to that of the turnable portions 4.

These drive means (FIGS. 1 and 2) comprise chambers 7 which are connected to the vacuum line 3 of the plant by means of pipe line 8. The upper portion of the chamber is formed by a rubber membrane 9 connected to a rod 10. Said rod 10 is connected to an end of a double-arm lever 11 whose other end is connected directly to counterweight 12 and, through a system of pulleys 13, and cable 14, to the turnable portion 4 of the milk line 2.

The milk line 2 consists of glass pipes 15 interconnected by rubber pipe branches 16. One end of the milk line 2 is closed and the other end is connected to air separator 17 whose branch pipe 18 is connected to the vacuum line 3, and whose branch pipe 19 is connected to branch pipe 20 of milk pump 21.

The vacuum line 3 is connected through safety valve 22 to vacuum pump 23.

The milking plant operates in the following manner. With the vacuum pump 23 in operation, vacuum is created in the vacuum line 3, air separator 17 and milk line 2. The milkers 1, connected to the milk line 2 and the vacuum line 3, carry out milking, and milk is delivered into the milk line 2 and therealong under the action of vacuum into the air separator 17, whereupon it is pumped out by the milk pump 21 into an intermediate space (not shown in the drawing).

In the course of milking, with the vacuum pump 23 switched on, the membrane 9 is drawn towards the bottom of chamber 7, and the rod 10 lowers one arm of the lever 11 whose other arm, while rising, lowers through the system of the pulleys 13 and the cable 14 the turnable portion 4 of the milk line 2 into the horizontal position.

During intervals between milking processes, with the vacuum pump 23 cut off, the turnable portion 4 of the milk line 2 rises under the action of the counterweight 12 to a height which provides for the passage of mobile means of fodder distribution.

To facilitate rising of the turnable portion of the milk line and to make the construction rigid, the portion 4 is secured to a tubular shaped frame 24 movably connected to the vacuum line 3.

What we claim is:

1. A milking plant comprising a milking apparatus, a vacuum line adapted to produce a vacuum in said milking apparatus, means for creating a vacuum in said vacuum line, a milk line connected to said milking apparatus and subject to the vacuum in the vacuum line to suck milk from the milking apparatus and transport the milk, said milk line including at least one turnable portion, and drive means for turning the turnable portion of the milk line between raised and lowered positions, said drive means being connected to said vacuum line for respectively raising and lowering said turnable portion in accordance with the absence and presence of vacuum in the vacuum line.

2. A milking plant as claimed in claim 1 wherein said drive means comprises a chamber connected to said vacuum line, and a displaceable member at said chamber and subject to vacuum therein and coupled to said turnable portion to move the same.

3. A milking plant as claimed in claim 2 wherein said displaceable member is a flexible membrane bounding said chamber.

4. A milking plant as claimed in claim 3 wherein said drive means further comprises a pivotal lever having opposite ends one of which is connected to said membrane, and the other of which is coupled to said turnable portion.

5. A milking plant as claimed in claim 4 wherein said drive means further comprises a pulley system connecting said turnable portion and said other end of the lever, and a counterweight connected to said other end of the lever.

6. A milking plant as claimed in claim 1 wherein said milk line is an elongated system with opposed end sections, each of which is a turnable portion.